Figure 1:
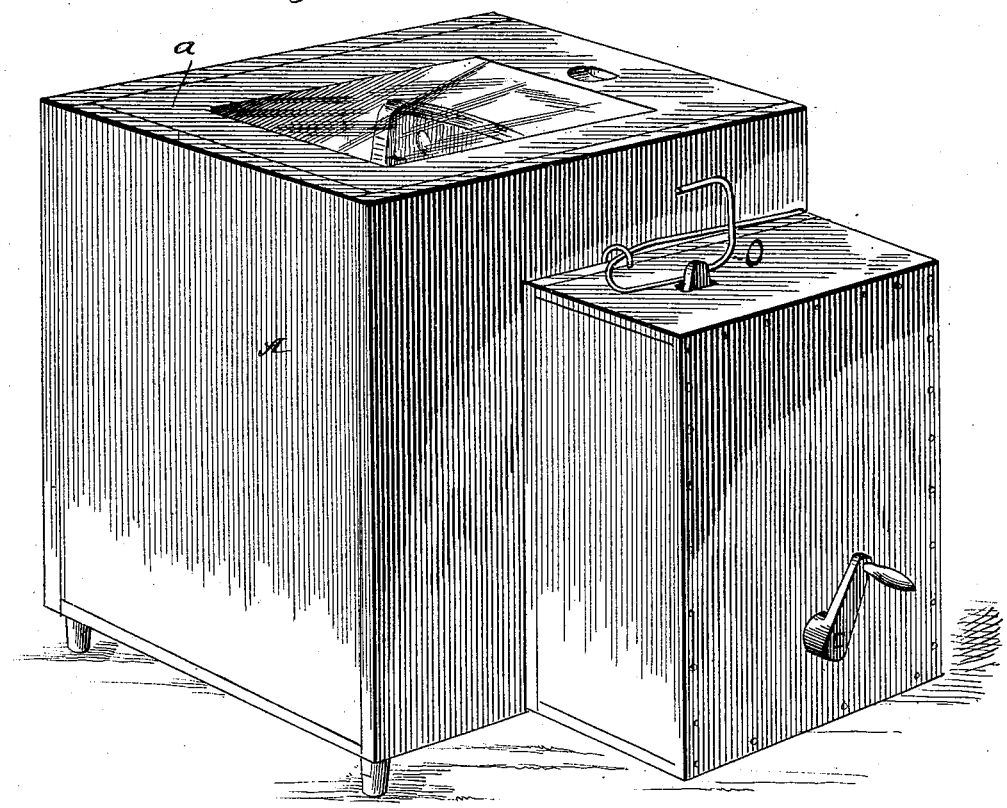

(No Model.)  3 Sheets—Sheet 1.

G. W. STILES.
MOTOR FOR CHURNS.

No. 393,314. Patented Nov. 20, 1888.

WITNESSES.
Edwin L. Yewell,
Wm. J. Littell,

INVENTOR,
George W. Stiles,
by J. R. Littell, Attorney.

(No Model.) 3 Sheets—Sheet 2.
G. W. STILES.
MOTOR FOR CHURNS.
No. 393,314. Patented Nov. 20, 1888.
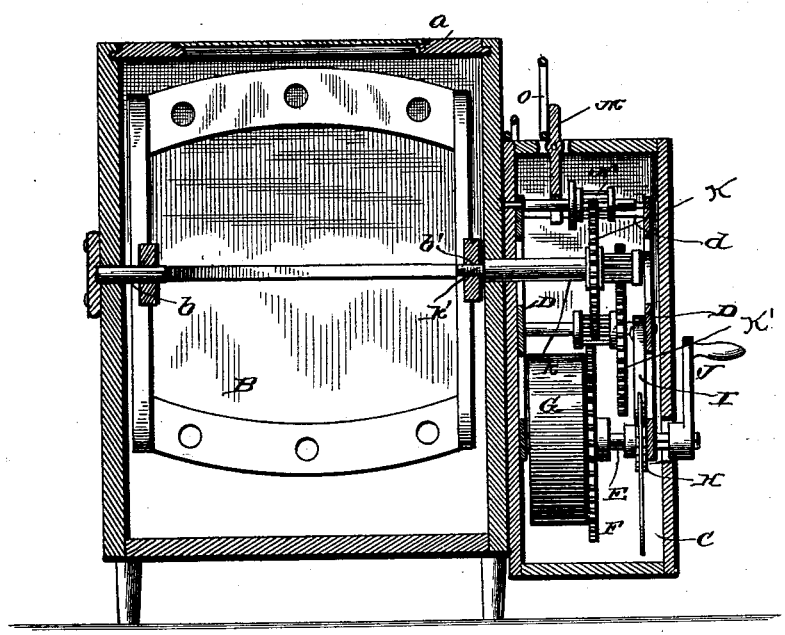
WITNESSES.
Edwin T. Yewell,
Wm. J. Littell,
INVENTOR.
George W. Stiles,
by J. R. Littell,
Attorney.

(No Model.) 3 Sheets—Sheet 3.
G. W. STILES.
MOTOR FOR CHURNS.
No. 393,314. Patented Nov. 20, 1888.
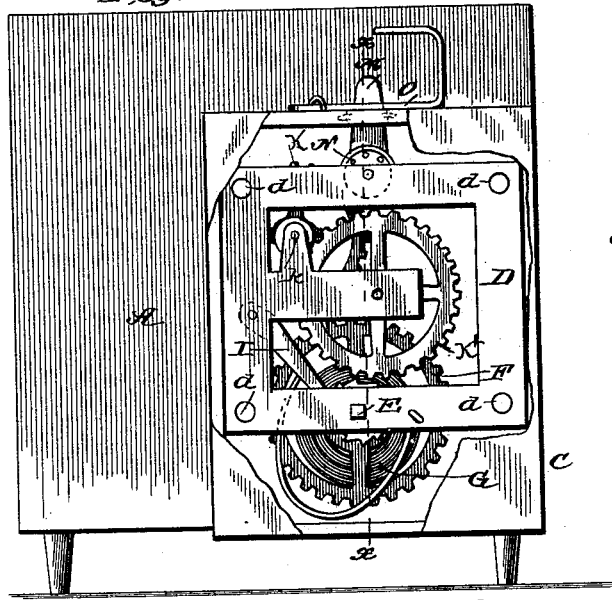
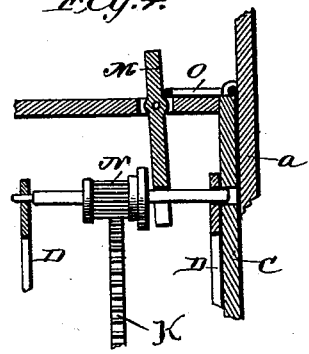
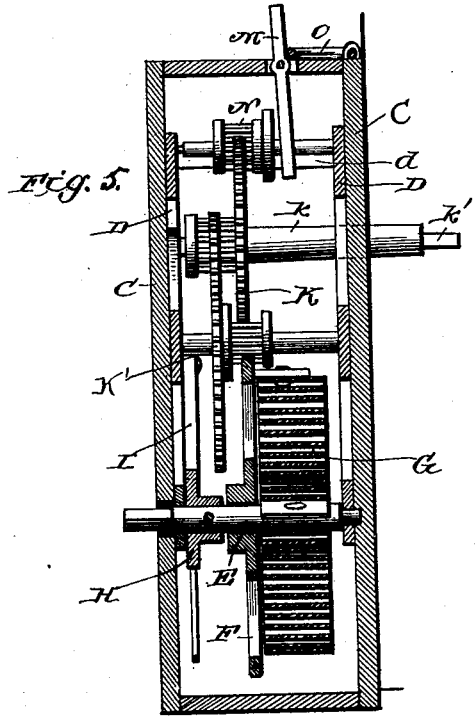
WITNESSES,
Edwin I. Yewell.
Wm. J. Littell,
INVENTOR.
George W. Stiles,
by J. R. Littell
Attorney.

UNITED STATES PATENT OFFICE.

GEORGE WASHINGTON STILES, OF SMITH'S MILLS, PENNSYLVANIA.

MOTOR FOR CHURNS.

SPECIFICATION forming part of Letters Patent No. 393,314, dated November 20, 1888.

Application filed March 15, 1888. Serial No. 267,260. (No model.)

*To all whom it may concern:*

Be it known that I, GEORGE WASHINGTON STILES, a citizen of the United States, residing at Smith's Mills, in the county of Clearfield and State of Pennsylvania, have invented certain new and useful Improvements in Churn-Motors, of which the following is a specification.

This invention relates to motors of that class designed more especially for operating churns; and it has for its object to provide a device of this character possessing advantages in point of simplicity, inexpensiveness, durability, and general efficiency.

In the drawings, Figure 1 is a perspective view of a churn having my improved motor applied thereto and illustrating the stop mechanism. Fig. 2 is a transverse sectional view. Fig. 3 is a side elevation, part of the casing containing the operating mechanism being broken away. Fig. 4 is a detail sectional view showing the device for stopping the mechanism. Fig. 5 is a detail sectional view on the line *x x*, Fig. 3.

Corresponding parts in the figures are denoted by the same letters of reference.

Referring to the drawings, A designates the churn-body, which may be of any suitable or preferred construction, and is provided with a suitable cover, *a*. Within the churn-body is disposed a churn-dasher, B, provided with a bearing, *b*, at one side and with a recess, *b'*, at the opposite side, the purpose of the latter being hereinafter set forth.

C designates a rectangular casing secured to one side of the churn-body and adapted to inclose the operating mechanism. The operating mechanism comprises two corresponding oppositely-disposed plates, D D, connected and retained in position by four cross-bars, *d*, one at each corner of the plates D. Between the plates D, and having bearings therein, is provided a shaft, E, upon which is loosely mounted a gear-wheel, F. Upon the shaft E, at one side of the gear-wheel F, is secured the inner end of a flat coil-spring, G, the outer end thereof being secured to an arm projecting from the gear-wheel. At the opposite side of the gear-wheel, and rigidly mounted upon the shaft E, is a ratchet, H, engaged by a spring-actuated pawl, I, pivoted to one of the plates D. The outer end of the shaft E extends through an opening in the casing, and a crank-arm, J, is rigidly secured thereto for winding the spring. It will be observed that when the spring has been wound up by means of the crank-arm and the mechanism set in motion the shaft E and said crank-arm do not rotate with the gear-wheel upon the shaft, by reason of the engagement with the ratchet of the pawl above described, but remain stationary, except for the purpose of winding.

K designates a gear-wheel rigidly secured to a shaft, *k*, mounted in the frame and connected with the gear-wheel F by an intermediate gear-wheel or wheels. The inner end of the shaft *k* is extended and projects through an opening in the casing and churn-body. The extreme end of this shaft is reduced to form a rectangular portion, *k'*, corresponding to and adapted to fit in the recess *b'* in the dasher.

A device for stopping the mechanism is provided, comprising an arm, M, pivoted near its center to the top of the casing and having its lower end adapted to bind against a pinion, N, meshing with the gear-wheel K. The upper end of this arm projects through the casing, and is engaged by an approximately U-shaped spring-arm, O. This spring-arm is adapted to normally occupy the same plane with the pivot of the arm M, and will therefore exert a pressure against either side of the outer end of the arm M, to which it has been adjusted, for the purpose of causing the lower end of said arm to bind against or be removed from engagement with the pinion N to stop the mechanism or permit it to start.

If desired, the mechanism may be provided with a suitable governor for regulating the speed thereof.

I claim as my invention—

The herein-described churn-motor, comprising a main shaft, E, a gear-wheel, F, loosely mounted thereon, a spring, G, having its inner end secured to the shaft and its outer end to the gear-wheel, whereby said shaft is adapted to remain stationary while the motor is in operation, a ratchet, H, rigidly secured to the shaft and engaged by a spring-actuated pawl, I, a shaft, $k$, having one end extended through the casing, for the purpose stated, and provided with a gear-wheel, K, intermediate gear connecting the latter with the gear-wheel F, and a spring-actuated brake, M, adapted to bear against one of the pinions of the motor, all arranged and adapted to operate substantially as shown and described.

In testimony whereof I affix my signature in presence of two witnesses.

GEORGE WASHINGTON STILES.

Witnesses:
 GEORGE W. SMITH,
 SAMUEL SMITH.